United States Patent [19]

Uetake et al.

[11] 4,268,128
[45] May 19, 1981

[54] OCULAR OF LARGE VISUAL FIELD

[75] Inventors: Toshifumi Uetake; Masaki Matsubara, both of Hachiouji, Japan

[73] Assignee: Olympus Optical Co., Ltd., Tokyo, Japan

[21] Appl. No.: 40,871

[22] Filed: May 21, 1979

[30] Foreign Application Priority Data

May 25, 1978 [JP] Japan ................... 53-62598

[51] Int. Cl.³ .................. G02B 3/00; G02B 9/34
[52] U.S. Cl. ........................ 350/410; 350/472
[58] Field of Search ................ 350/175 E, 223

[56] References Cited

U.S. PATENT DOCUMENTS 3,862,796  1/1975  DeJager .............. 350/175 E X
4,145,108  3/1979  Itaya .................. 350/175 E

FOREIGN PATENT DOCUMENTS 44-25751  10/1969  Japan .................. 350/223

*Primary Examiner*—John K. Corbin
*Assistant Examiner*—Scott J. Sugarman
*Attorney, Agent, or Firm*—Cushman, Darby & Cushman

[57] ABSTRACT

The present invention relates to an ocular comprising a first lens component of a positive single or cemented lens, a second lens component of a positive single lens, a third lens component of a biconcave lens and a fourth lens component of a positive single lens. The ocular is constituted of a triplet type lens system comprising as a basis the second through fourth lens components and, in addition, the positive single or cemented lens.

4 Claims, 11 Drawing Figures

CURVATURE OF FIELD OF OBJECTIVE

CURVATURE OF FIELD OF EYERIECE

CURVATURE OF FIELD OF OVERALL LENS SYSTEM

ASTIGMATISM

ASTIGMATISM

OCULAR OF LARGE VISUAL FIELD

FIELD OF THE INVENTION

The present invention relates to an ocular of large visual field.

DESCRIPTION OF THE PRIOR ART

Since an ocular is a kind of magnifying lens, most oculars generally have such a simple construction that they are constituted of a combination of convex lenses. Therefore, such an ocular is generally one wherein the Petzval sum is of positive and of large value so that there occurs a large inclination of image, making it impossible to obtain a good image to a peripheral portion of a visual field. Since the inclination of image by this ocular is very large as shown in FIG. 7B, even if an attempt is made to obtain a flat image by cancelling this inclination of image with a reversed-directional inclination of the objective lens as shown in FIG. 7A, the inclination of image remains uncorrected as shown in FIG. 7C. When the meridional plane is made to stand closer to the Gauss plane in order to correct the inclination of image, there occurs a separation between the meridional plane and the sagital plane (that is, the astigmatism in FIG. 8A changed to that as shown in FIG. 8B), so that a so called astigmatism largely remains and the image is deteriorated in quality. Furthermore, as the coma remains without being sufficiently corrected at the portion where the numerical aperture is large, it has not been possible to obtain a good image when combined with the objective lens having a large numerical aperture. The defects as explained above are increased further as the visual field is increased.

SUMMARY OF THE INVENTION

The object of the present invention is to provide a microscope eyepiece by which the flatness of image is improved, the astigmatism and coma are well corrected, and the flatness, etc. of image is improved over a wide visual field, and in which the eye-point (eye-relief) is long.

As described above, in a conventional ocular, the Petzval sum is of positive and of large value. Therefore, in order to correct this Petzval sum, it is necessary to provide a concave lens having a strong refractive power in the lens system. By having regard to the fact that a triplet lens system conventionally known as photographic lenses contained a concave lens having a strong refractive power, it has been arranged for the ocular according to the present invention to comprise a triplet type lens system as a basis and, in addition, a positive single or cemented lens, in which the Petzval sum is made small and by which the astigmatism and coma are well corrected.

An ocular according to the present invention comprises four lens components, as viewed in the direction of incident of light, having a first lens component of a positive single or cemented lens, a second lens component of a positive single lens, a third lens component of a biconcave lens and a fourth lens component of a positive single lens, satisfying each of the following conditions:

$$1.65 < n_3 \tag{1}$$

$$0.7 < f_A/f_B < 1.3 \tag{2}$$

$$0.004f < d_2 < 0.25f \tag{3}$$

$$r_4 < -3f \tag{4}$$

$$0.08f < d_1 + d'_1 < 0.36f \tag{5}$$

wherein the reference symbol $f$ represents the equivalent focal length of the total lens system, the symbol $f_A$ represents the equivalent focal length of the first lens component, the symbol $f_B$ represents the equivalent focal length of the triplet consisted of the second, third and fourth lens components, the symbol $n_3$ represents the refractive index of the third lens component, the symbol $d_1 + d'_1$ represents the axial thickness of the first lens component, the symbol $d_2$ represents the axial air space between the first and second lens components, and the symbol $r_4$ represents the radius of curvature of the lens surface at the eye side of the second lens component, respectively.

In the above described ocular according to the present invention, the condition (1) is for the purpose of decreasing the Petzval sum. It has been known that the Petzval sum can be made small by using a high refractive index material for the third lens component of a concave lens. From this viewpoint, an ocular of the present invention is intended to have the Petzval sum decreased by making the refractive index of the third lens component as large as possible. When the lower limit of the condition (1), which is for the purpose of decreasing the Petzval sum, is exceeded, the curvature of field cannot be sufficiently corrected even if an attempt is made to correct this by other components. In the ocular according to the present invention, a relatively high refractive index material is used for the convex lenses in order to correct the spherical aberration, which is disadvantageous in the correction of the curvature of field. Therefore, for the concave lens of the third lens component, an even higher refractive index material is used as in the condition (1).

The condition (2) is established in order to maintain the balance of the aberrations in the total lens system. When the lower limit of this condition (2) is exceeded, the refractive power of the first lens component becomes too strong and distortion occurs. And, this distortion cannot be sufficiently corrected by the triplet (the second through fourth lens components), which is undesirable for wide visual fields. When the upper limit of this condition (2) is exceeded, the refractive power of the triplet becomes too strong and astigmatism occurs at the portions where the angle of view is large, which is typical of a lens of such type, so that the image at the peripheral portions is deteriorated in its quality.

The condition (3) is primarily for the purpose of improving the symmetry of coma. The symmetry of coma is improved by making the specific space $d_2$ among the spaces in the lens system large to the extent as shown in the condition (3). When the lower limit of the condition (3) is exceeded, the symmetry of coma is deteriorated and a good image quality cannot be achieved. When the upper limit thereof is exceeded, the curvature of field unavoidably increases. Also, it is possible to further improve the coma by making large the space $d_6$ between the third and fourth lens components to some extent independently of the space $d_2$. In this case, it is desirable that the space $d_6$ is set within the limits of the condition (6).

$$0.06f < d_6 < 0.2f \tag{6}$$

When the upper limit and lower limit of this condition (6) are exceeded, the above explained defects occur in the same ways the upper and lower limits of the condition (3) are exceeded, respectively.

The condition (4) is primarily for the purpose of making the eye-point higher. The eye-point can be made higher by arranging that the surface $r_4$ is convex and the rear side principal point of the total lens system is positioned closer to the eye side. However, when the refractive power of this surface is made strong, that is, the refractive power of this surface becomes too strong, the Petzval sum is increased. Therefore, when the upper limit of the condition (4) is exceeded, the Petzval sum is increased and this is undesirable. When the surface $r_4$ is concave, the eye-point cannot be made high because the rear side principal point approaches the object side too closely.

When the thickness of the first lens component is increased, spherical aberration occurs. And, when the thickness of the first lens component exceeds the upper limit of the condition (5), it becomes difficult to correct the spherical aberration by other lens components and also the curvature of field increases. On the other hand, it is advantageous for correction of spherical aberration and the curvature of field to make the thickness of the first lens component thinner. However, in this case, the distortion is increased and, when the lower limit of the condition (5) is exceeded, it becomes impossible to correct this distortion.

Further objects and advantages of the present invention will be apparent in the arrangements as set forth in the following specification taken together with the accompanying drawings.

DESCRIPTION OF THE PREFERRED EMBODIMENTS

Next, some preferred embodiments of the present invention relating to the ocular as described above are given below:

| Embodiment 1 | | | |
|---|---|---|---|
| $r_1 = 32.506$ | | | |
| | $d'_1 = 0.04$ | $n'_1 = 1.6689$ | $v'_1 = 45$ |
| $r'_2 = 1.381$ | | | |
| | $d_1 = 0.24$ | $n_1 = 1.6204$ | $v_1 = 60.3$ |
| $r_2 = -1.102$ | | | |
| | $d_2 = 0.008$ | | |
| $r_3 = 0.831$ | | | |
| | $d_3 = 0.164$ | $n_2 = 1.6204$ | $v_2 = 60.3$ |
| $r_4 = 4.694$ | | | |
| | $d_4 = 0.139$ | | |
| $r_5 = -0.672$ | | | |
| | $d_5 = 0.04$ | $n_3 = 1.7847$ | $v_3 = 25.7$ |
| $r_6 = 1.129$ | | | |
| | $d_6 = 0.102$ | | |
| $r_7 = 2.562$ | | | |
| | $d_7 = 0.2$ | $n_4 = 1.7260$ | $v_4 = 43.7$ |
| $r_8 = -0.656$ | | | |
| | $f = 1$ | $f_1 = 1.82$ | $f_B = 1.615$ |
| Petzval sum 0.643 | | | |

| Embodiment 2 | | | |
|---|---|---|---|
| $r_1 = 14.258$ | | | |
| | $d'_1 = 0.04$ | $n'_1 = 1.6689$ | $v'_1 = 45$ |
| $r'_2 = 1.386$ | | | |
| | $d_1 = 0.240$ | $n_1 = 1.6204$ | $v_1 = 60.3$ |
| $r_2 = -1.040$ | | | |
| | $d_2 = 0.2$ | | |
| $r_3 = 0.798$ | | | |
| | $d_3 = 0.164$ | $n_2 = 1.6204$ | $v_2 = 60.3$ |
| $r_4 = -3.893$ | | | |
| | $d_4 = 0.120$ | | |
| $r_5 = -0.676$ | | | |
| | $d_5 = 0.040$ | $n_3 = 1.7847$ | $v_3 = 25.7$ |
| $r_6 = 1.139$ | | | |
| | $d_6 = 0.102$ | | |
| $r_7 = 2.492$ | | | |
| | $d_7 = 0.200$ | $n_4 = 1.7200$ | $v_4 = 43.7$ |
| $r_8 = -0.662$ | | | |
| | $f = 1$ | $f_1 = 1.648$ | $f_B = 1.510$ |
| Petzval sum 0.718 | | | |

| Embodiment 3 | | | |
|---|---|---|---|
| $r_1 = \infty$ | | | |
| | $d_1 = 0.128$ | $n_1 = 1.72$ | $v_1 = 43.7$ |
| $r_2 = 1.121$ | | | |
| | $d_2 = 0.012$ | | |
| $r_3 = 0.798$ | | | |
| | $d_3 = 0.16$ | $n_2 = 1.6223$ | $v_2 = 53.2$ |
| $r_4 = \infty$ | | | |
| | $d_4 = 0.128$ | | |
| $r_5 = -0.818$ | | | |
| | $d_5 = 0.052$ | $n_3 = 1.7847$ | $v_3 = 25.7$ |
| $r_6 = 0.925$ | | | |
| | $d_6 = 0.160$ | | |
| $r_7 = 1.920$ | | | |
| | $d_7 = 0.160$ | $n_4 = 1.72$ | $v_4 = 43.7$ |
| $r_8 = 0.750$ | | | |
| | $f = 1$ | $f_1 = 1.557$ | $f_B = 1.743$ |
| Petzval sum 0.617 | | | | wherein the reference symbols $r_1$ through $r_8$ represent radii of curvature of the respective lens surfaces, the symbols $d_1$ through $d_7$ represent the axial thicknesses of the respective lenses and the axial air spaces between the lenses, the symbols $n_1$ through $n_4$ represent the refractive indices of the respective lenses and the symbols $v_1$ through $v_4$ represent the Abbe numbers of the respective lenses, respectively.

Figure 1:
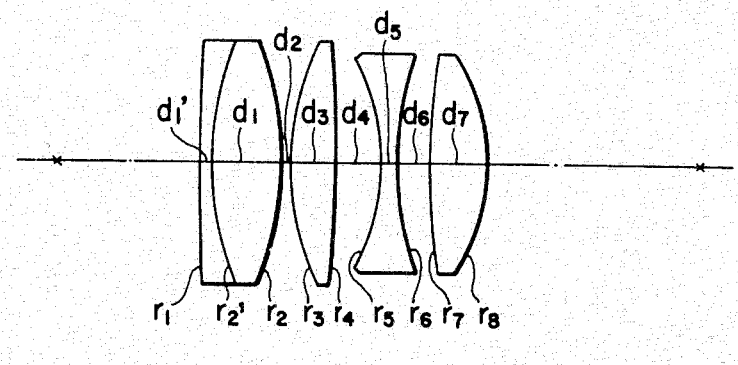
FIGS. 1 through 3 are sectional view of the embodiments 1 through 3 relating to oculars according to the present invention, respectively.
Figure 2:
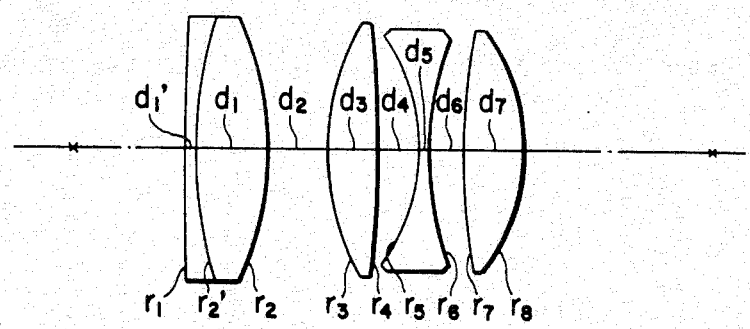

In these embodiments, the ocular of the embodiment 1 has a lens construction as shown in FIG. 1 and the ocular of the embodiment 2 has a lens construction as shown in FIG. 2, the first lens component in each of which is in the form of a cemented lens. Thus, the radius of curvature of the cemented surface of the first lens component is represented as $r'_2$, the axial thicknesses of both lenses thereof are represented as $d'_1$ and $d_1$, the refractive indices of both lenses are represented as $n'_1$ and $n_1$, and the Abbe numbers of both lenses are represented as $v'_1$ and $v_1$, respectively.

Figure 3:
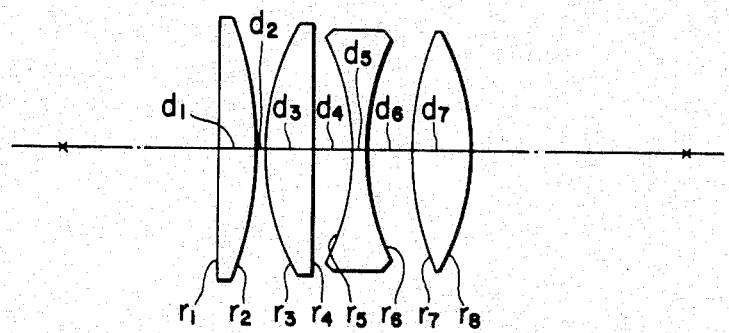
Figure 4:
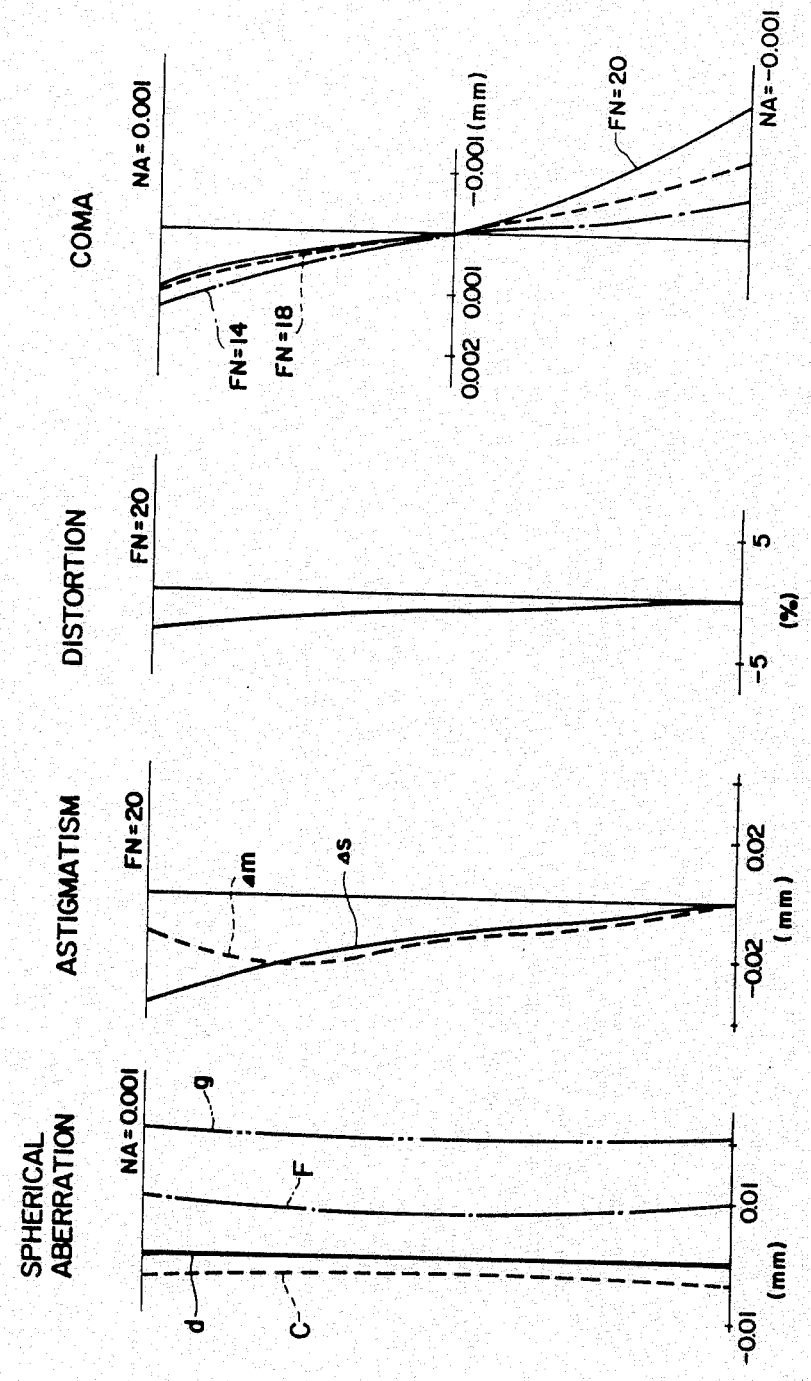
FIGS. 4 through 6 show graphs illustrating conditions of aberrations of the embodiments 1 through 3, respectively.
Figure 5:
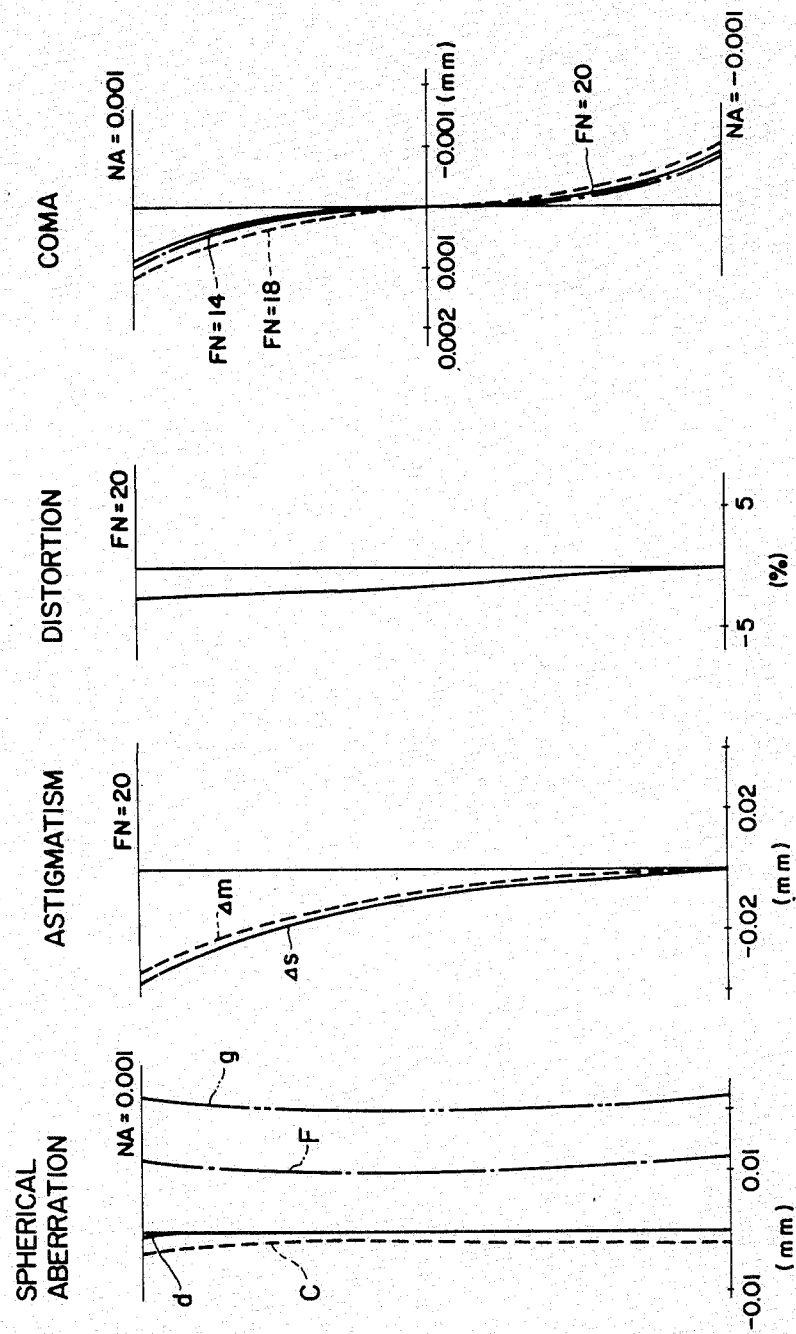
Figure 6:
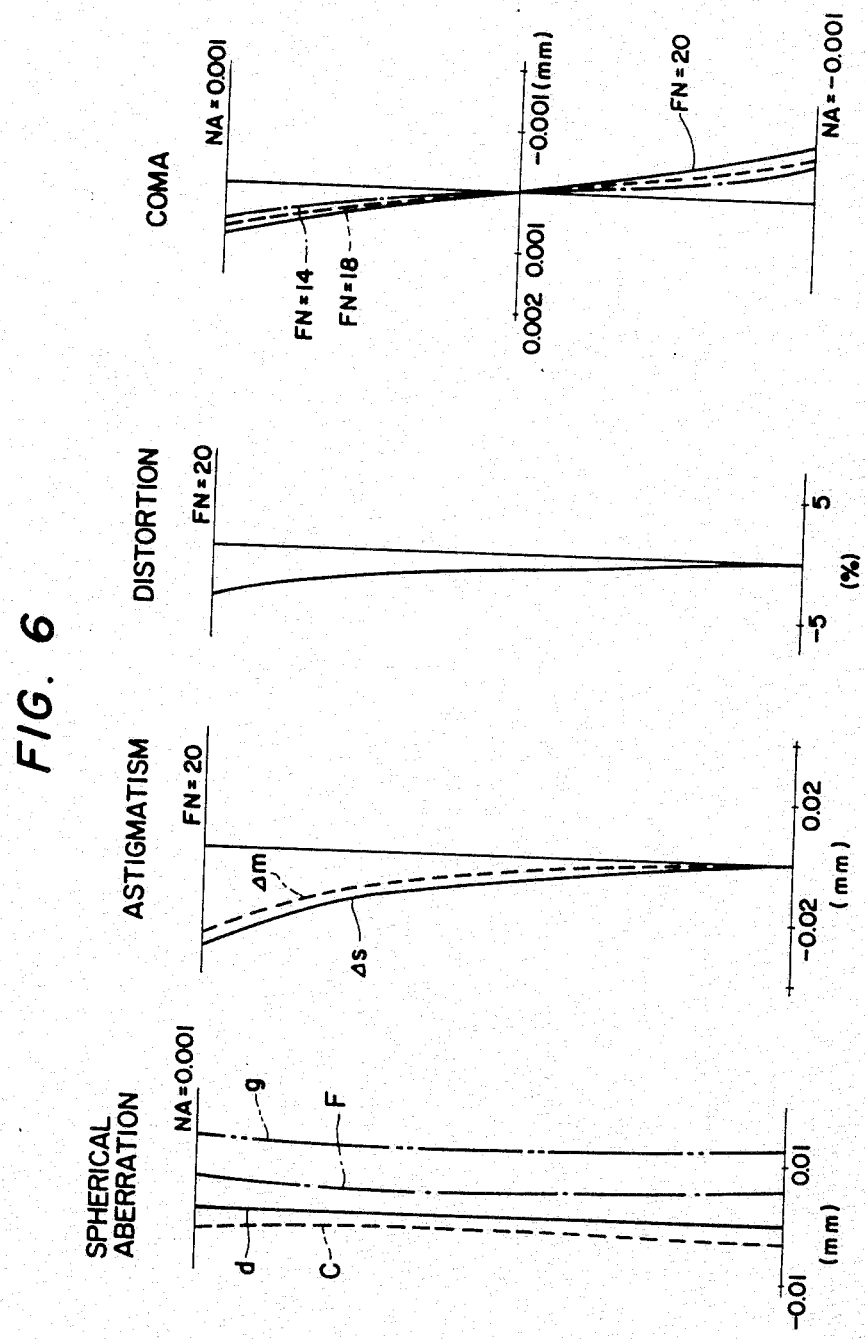
Figure 7A:
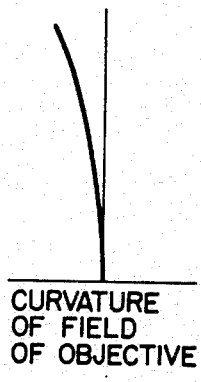
FIGS. 7A, 7B and 7C are explanatory illustrations showing condition of the curvature of field in conventional oculars.
Figure 7B:
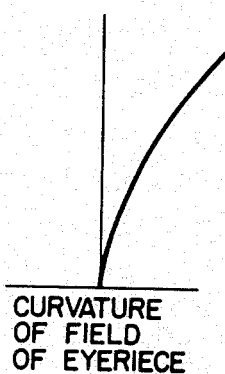
Figure 7C:
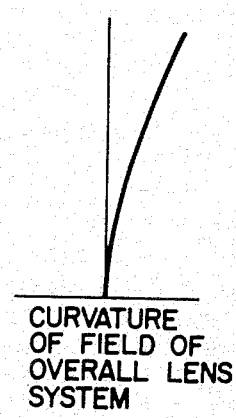
Figure 8A:
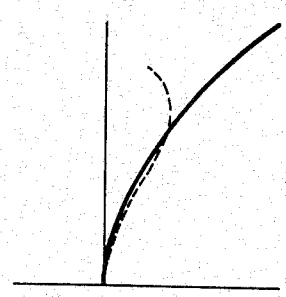
FIGS. 8A and 8B are explanatory illustrations showing the astigmatism in conventional oculars.
Figure 8B:
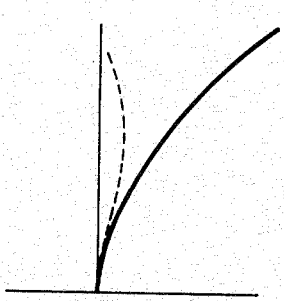

In these embodiments, each of the lens systems is constituted as a compensating ocular with the first lens component being in the form of a cemented lens, in which the chromatic aberration of a constant value occurs in order to correct the lateral chromatic aberration resulted from the objective lens system. The embodiment 3 has a lens construction as shown in FIG. 3, in which the first lens component is a single lens. Therefore, the axial thickness of the first lens component as given in the condition (5) becomes $d_1$. This embodiment is for an ocular in which the lateral chromatic aberration is sufficiently well-corrected in this lens system itself.

We claim:

1. An ocular having wide visual field comprising a front lens group consisting only of a first lens component having positive refractive power and a rear lens group which is a triplet consisting of a second positive lens component, a third biconcave lens component and a fourth positive lens component, said ocular being so designed as to satisfy the following conditions:

$$1.65 < n_3 \tag{1}$$

$$0.7 < f_A/f_B < 1.3 \tag{2}$$

$$0.004f < d_2 < 0.25f \tag{3}$$

$$r_4 < -3f \tag{4}$$

$$0.08f < d_1 + d'_1 < 0.36f \tag{5}$$

$$0.06f < d_6 < 0.2f \tag{6}$$

wherein the reference symbol $f$ represents the equivalent focal length of the total lens system, the symbol $f_A$ represents the equivalent focal length of the first lens component, the symbol $f_B$ represents the equivalent focal length of the second through fourth lens components, the symbol $d_2$ represents the axial air space between the first and second lens components, the symbol $d_1 + d'_1$ represents the axial thickness of the first lens component, the symbol $r_4$ represents the radius of curvature of the lens surface at the eye side of the second lens component, the reference symbol $d_6$ represents the axial air space between the third and fourth lens components and the symbol $n_3$ represents the refractive index of the third lens component, respectively.

2. An ocular having wide visual field according to claim 1, in which the said first lens component is a positive cemented lens, having the following data:

| | | | |
|---|---|---|---|
| $r_1 = 32.506$ | | | |
| | $d'_1 = 0.04$ | $n'_1 = 1.6689$ | $v'_1 = 45$ |
| $r'_2 = 1.381$ | | | |
| | $d_1 = 0.24$ | $n_1 = 1.6204$ | $v_1 = 60.3$ |
| $r_2 = -1.102$ | | | |
| | $d_2 = 0.008$ | | |
| $r_3 = 43.7$ | | | |
| | $d_3 = 0.164$ | $n_2 = 1.6204$ | $v_2 = 60.3$ |
| $r_4 = -4.694$ | | | |
| | $d_4 = 0.139$ | | |
| $r_5 = -0.672$ | | | |
| | $d_5 = 0.04$ | $n_3 = 1.7847$ | $v_3 = 25.7$ |
| $r_6 = 1.129$ | | | |
| | $d_6 = 0.102$ | | |
| $r_7 = 2.562$ | | | |
| | $d_7 = 0.2$ | $n_4 = 1.7260$ | $v_4 = 43.7$ |
| $r_8 = -0.656$ | | | |
| | $f = 1$ | $f_A = 1.82$ | $f_B = 1.615$ |
| | Petzval sum 0.643 | | | wherein the reference symbols $r_1$ through $r_8$ represent radii of curvature of the respective lens surfaces, the symbols $d_1$ through $d_7$ represent the axial thicknesses of the respective lenses and the axial air spaces between the lenses, the symbols $n_1$ through $n_4$ represent the refractive indices of the respective lenses, the symbols $v_1$ through $v_4$ represent the Abbe numbers of the respective lenses, the reference symbol $f$ represents the equivalent focal length of the total lens system, the symbol $f_A$ represents the equivalent focal length of the first lens component and the symbol $f_B$ represents the equivalent focal length of the second through fourth lens components, respectively.

3. An ocular having wide visual field according to claim 1, in which the said first lens component is a positive cemented lens, having the following data:

| | | | |
|---|---|---|---|
| $r_1 = 14.258$ | | | |
| | $d'_1 = 0.04$ | $n'_1 = 1.6689$ | $v'_1 = 45$ |
| $r'_2 = 1.386$ | | | |
| | $d_1 = 0.240$ | $n_1 = 1.6204$ | $v_1 = 60.3$ |
| $r_2 = -1.040$ | | | |
| | $d_2 = 0.2$ | | |
| $r_3 = 0.798$ | | | |
| | $d_3 = 0.164$ | $n_2 = 1.6204$ | $v_2 = 60.3$ |
| $r_4 = -3.893$ | | | |
| | $d_4 = 0.120$ | | |
| $r_5 = -0.676$ | | | |
| | $d_5 = 0.040$ | $n_3 = 1.7847$ | $v_3 = 25.7$ |
| $r_6 = 1.139$ | | | |
| | $d_6 = 0.102$ | | |
| $r_7 = 2.492$ | | | |
| | $d_7 = 0.200$ | $n_4 = 1.7200$ | $v_4 = 43.7$ |
| $r_8 = -0.662$ | | | |
| | $f = 1$ | $f_A = 1.648$ | $f_B = 1.510$ |
| | Petzval sum 0.718 | | | wherein the reference symbols $r_1$ through $r_8$ represent radii of curvature of the respective lens surfaces, the symbols $d_1$ through $d_7$ represent the axial thicknesses of the respective lenses and the axial air spaces between the lenses, the symbols $n_1$ through $n_4$ represent the refractive indices of the respective lenses, the symbols $v_1$ through $v_4$ represent the Abbe numbers of the respective lenses, the reference symbol $f$ represents the equivalent focal length of the total lens system, the symbol $f_A$ represents the equivalent focal length of the first lens component and the symbol $f_B$ represents the equivalent focal length of the second through fourth lens components, respectively.

4. An ocular having wide visual field according to claim 1, in which the said first lens component is a positive single lens, having the following data:

| | | | |
|---|---|---|---|
| $r_1 = \infty$ | | | |
| | $d_1 = 0.128$ | $n_1 = 1.72$ | $v_1 = 43.7$ |
| $r_2 = -1.121$ | | | |
| | $d_2 = 0.012$ | | |
| $r_3 = 0.798$ | | | |
| | $d_3 = 0.16$ | $n_2 = 1.6223$ | $v_2 = 53.2$ |
| $r_4 = \infty$ | | | |
| | $d_4 = 0.128$ | | |
| $r_5 = -0.818$ | | | |
| | $d_5 = 0.052$ | $n_3 = 1.7847$ | $v_3 = 25.7$ |
| $r_6 = 0.925$ | | | |
| | $d_6 = 0.160$ | | |
| $r_7 = 1.920$ | | | |
| | $d_7 = 0.160$ | $n_4 = 1.72$ | $v_4 = 43.7$ |
| $r_8 = -0.750$ | | | |
| | $f = 1$ | $f_A = 1.557$ | $f_B = 1.743$ |
| | Petzval sum 0.617 | | | wherein the reference symbols $r_1$ through $r_8$ represent radii of curvature of the respective lens surfaces, the symbols $d_1$ and $d_7$ represent the axial thicknesses of the respective lenses and the axial air spaces between the lenses, the symbols $n_1$ through $n_4$ represent the refractive indices of the respective lenses, the symbols $v_1$ through $v_4$ represent the Abbe numbers of the respective lenses, the reference symbol $f$ represents the equivalent focal length of the total lens system, the symbol $f_A$ represents the equivalent focal length of the first lens component and the symbol $f_B$ represents the equivalent focal length of the second through fourth lens components, respectively.

* * * * *